United States Patent
Satou

(10) Patent No.: US 10,955,827 B2
(45) Date of Patent: Mar. 23, 2021

(54) CONTROLLER AND MACHINE LEARNING DEVICE FOR CONTROLLING A CONVEYING MACHINE TO OPTIMIZE CONVEYANCE OF AN ARTICLE

(71) Applicant: FANUC CORPORATION, Yamanashi (JP)

(72) Inventor: Yoshiki Satou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 350 days.

(21) Appl. No.: 16/103,046

(22) Filed: Aug. 14, 2018

(65) Prior Publication Data
US 2019/0056718 A1    Feb. 21, 2019

(30) Foreign Application Priority Data
Aug. 18, 2017 (JP) ............... JP2017-158228

(51) Int. Cl.
*G06N 3/00* (2006.01)
*G05B 19/418* (2006.01)
(Continued)

(52) U.S. Cl.
CPC ......... *G05B 19/4182* (2013.01); *G06N 3/006* (2013.01); *G06N 3/08* (2013.01);
(Continued)

(58) Field of Classification Search
CPC ........ G05B 19/4182; G05B 2219/2621; G05B 2219/31432; G05B 2219/39102;
(Continued)

(56) References Cited

U.S. PATENT DOCUMENTS

| 4,965,344 A | 10/1990 | Hermann |
| 2007/0239315 A1* | 10/2007 | Sato ............ B25J 9/1612 |
| | | 700/245 |

(Continued)

FOREIGN PATENT DOCUMENTS

| EP | 3173879 A1 | 5/2017 |
| JP | H02193203 A | 7/1990 |

(Continued)

OTHER PUBLICATIONS

Notice of Reasons for Refusal for Japanese Application No. 2017-158228, dated Aug. 20, 2019, with translation, 6 pages.

*Primary Examiner* — Li Wu Chang
(74) *Attorney, Agent, or Firm* — RatnerPrestia

(57) ABSTRACT

A machine learning device provided in a control unit observes, as state variables representing a current state of an environment, conveyance operation data indicating a state of a conveyance operation of a conveying machine and conveyance article state data indicating a state of the conveyance article, and acquires, as determination data, conveyance speed determination data indicating an appropriateness determination result relating to a conveyance speed of the conveyance article and conveyance article state determination data indicating an appropriateness determination result relating to variation in the state of the conveyance article. The conveyance operation data and the conveyance article state data are then learned in association with each other by using the state variables and the determination data.

13 Claims, 11 Drawing Sheets

(51) Int. Cl.
 *G06N 20/00* (2019.01)
 *G06N 3/08* (2006.01)
(52) U.S. Cl.
 CPC ..... *G06N 20/00* (2019.01); *G05B 2219/2621* (2013.01); *G05B 2219/31432* (2013.01); *G05B 2219/39102* (2013.01)
(58) Field of Classification Search
 CPC .......... B65G 43/00; G06N 3/006; G06N 3/00; G06N 20/00; G06N 3/08
 See application file for complete search history.

(56) References Cited

U.S. PATENT DOCUMENTS

2017/0028553 A1* 2/2017 Tsuda .................... B25J 9/0084
2017/0028562 A1* 2/2017 Yamazaki ............. B25J 9/1697

FOREIGN PATENT DOCUMENTS

| | | |
|---|---|---|
| JP | 7-61422 A | 3/1995 |
| JP | 2594275 B2 | 3/1997 |
| JP | 9-156497 A | 6/1997 |
| JP | 10-194456 A | 7/1998 |
| JP | 2594275 Y | 2/1999 |
| JP | 2000181542 A | 6/2000 |
| JP | 2004075254 A | 3/2004 |
| JP | 2011248728 A | 12/2011 |
| JP | 2016-69050 A | 5/2016 |
| JP | 2017030137 A | 2/2017 |
| JP | 2017-65877 A | 4/2017 |

* cited by examiner

CONTROLLER AND MACHINE LEARNING DEVICE FOR CONTROLLING A CONVEYING MACHINE TO OPTIMIZE CONVEYANCE OF AN ARTICLE

CROSS-REFERENCE TO RELATED APPLICATION

This application is a new U.S. Patent Application that claims benefit of Japanese Patent Application No. 2017-158228, filed Aug. 18, 2017, the disclosure of this application is being incorporated herein by reference in its entirety for all purposes.

BACKGROUND OF THE INVENTION

1. Field of the Invention

The present invention relates to a controller for a conveying machine and a machine learning device, and more particularly to a controller and a machine learning device for controlling a conveying machine so that a conveyance article can be conveyed at a higher speed within a range in which the conveyance article does not fall, receive an impact, spill, lose its shape, or deviate from its position.

2. Description of the Related Art

Conventionally, a conveying machine such as a conveyor or an automatic conveying vehicle is used to convey an article. Japanese Patent Application Laid-Open No. 2017-065877 and Japanese Patent Application Laid-Open No. 10-194456, for example, disclose conveying machines for conveying articles by conveyor. Further, Japanese Patent Application Laid-Open No. 07-061422, Japanese Utility Model Registration No. 2594275, and Japanese Patent Application Laid-Open No. 2016-069050 disclose conveying machines for conveying containers filled with liquid. Furthermore, Japanese Patent Application Laid-Open No. 09-156497 discloses an automatic conveying vehicle for conveying a package through a factory.

Typically, when attempting to convey a conveyance article at high speed, a strong impact is exerted on the conveyance article during acceleration and deceleration. Further, when the conveyance article is a container filled with liquid, the liquid spills, when the conveyance article is a fragile object, the conveyance article loses its shape, and when the conveyance article is stacked, the conveyance article falls or deviates from its carrying position. Therefore, in a conventional conveying machine, to ensure that these problems do not occur in the conveyance article, the conveyance article is conveyed after setting an appropriate conveyance speed.

However, by adjusting the conveyance speed appropriately in either an acceleration direction or a deceleration direction in accordance with the conveyance state of the conveyance article, it may be possible to convey the conveyance article at a higher speed. For example, depending on the carrying state or the current position of the conveyance article on the conveying machine, the conveyance article may be carried uphill by the conveying machine, and it may be possible to accelerate to a higher speed without any problems occurring in the state of the conveyance article. However, according to the prior art, dynamic speed adjustment taking the state of the conveyance article into account in this manner is not implemented, and therefore the conveyance speed cannot be increased sufficiently.

SUMMARY OF THE INVENTION

Hence, an object of the present invention is to provide a controller and a machine learning device for controlling a conveying machine so that a conveyance article can be conveyed at a higher speed within a range in which no problems occur in the conveyance article.

A controller according to the present invention solves the problem described above by learning, through machine learning, how to control a conveyance operation of a conveying machine relative to a state of a conveyance article conveyed by the conveying machine, and controlling the conveyance operation of the conveying machine on the basis of the result of the machine learning so that the conveyance article is conveyed at a higher speed within a range in which no problems occur in the conveyance article.

A controller according to an aspect of the present invention controls a conveying machine that conveys a conveyance article, and includes a machine learning device that learns how to control a conveyance operation of the conveying machine relative to a state of the conveyance article. The machine learning device includes: a state observation unit that observes, as state variables representing a current state of an environment, conveyance operation data indicating a state of the conveyance operation of the conveying machine, and conveyance article state data indicating the state of the conveyance article; a determination data acquisition unit that acquires, as determination data, conveyance speed determination data indicating an appropriateness determination result relating to a conveyance speed of the conveyance article, and conveyance article state determination data indicating an appropriateness determination result relating to variation in the state of the conveyance article; and a learning unit that learns the conveyance operation data and the conveyance article state data in association with each other by using the state variables and the determination data.

The conveyance operation data may further include a state of attitude modification of the conveyance article.

The state observation unit may further observe, as the state variables, conveyance position data indicating a position of the conveying machine or the conveyance article.

The state observation unit may further observe, as the state variables, conveyance article property data indicating a property of the conveyance article.

The learning unit may include: a reward calculation unit for determining a reward in relation to the appropriateness determination results; and a value function updating unit for updating a function representing a value of the conveyance operation of the conveying machine relative to the state of the conveyance article by using the value.

The learning unit may calculate the state variables and the determination data in a multilayer structure.

The machine learning device may further include a decision-making unit that outputs a command value for determining the control of the conveyance operation of the conveying machine on the basis of a learning result acquired by the learning unit.

The learning unit may learn how to control the conveyance operation of the conveying machine in each of the plurality of controllers using the state variables and the determination data, which are acquired in relation to each of the plurality of controllers.

The machine learning device may exist in a cloud server.

A machine learning device according to an aspect of the present invention learns how to control a conveyance operation of a conveying machine that conveys a conveyance article relative to a state of the conveyance article during the conveyance operation, and includes: a state observation unit that observes, as state variables representing a current state of an environment, conveyance operation data indicating a state of the conveyance operation of the conveying machine, and conveyance article state data indicating the state of the conveyance article; a determination data acquisition unit that acquires, as determination data, conveyance speed determination data indicating an appropriateness determination result relating to a conveyance speed of the conveyance article, and conveyance article state determination data indicating an appropriateness determination result relating to variation in the state of the conveyance article; and a learning unit that learns the conveyance operation data and the conveyance article state data in association with each other by using the state variables and the determination data.

A learned model according to an aspect of the present invention causes a computer to function so as to output a value of selection of an action for controlling a conveyance operation of a conveying machine that conveys a conveyance article relative to a state of the conveyance article during the conveyance operation, and includes a value function for outputting, with respect to a state of an environment defined on the basis of conveyance operation data indicating a state of the conveyance operation of the conveying machine and conveyance article state data indicating the state of the conveyance article, a value of selection of an action for controlling the conveyance operation of the conveying machine that can be selected in the state of the environment. The value function has been obtained by learning, on the basis of an appropriateness determination result relating to a conveyance speed of the conveyance article and an appropriateness determination result relating to variation in the state of the conveyance article, which are obtained by executing a predetermined control action on the conveyance operation of the conveying machine in a predetermined environment state, the selection value of the predetermined control action in the predetermined environment state. The learned model then causes the computer to function so as to execute arithmetic using the value function, with the state of the environment and the action for controlling the conveyance operation of the conveying machine as input, and output, on the basis of an arithmetic result, a value of an action for controlling the conveyance operation of the conveying machine relative to the state of the environment.

The value function may be packaged in a multilayer-structure neural network.

A distilled model according to an aspect of the present invention causes a computer to function so as to output a value of selection of an action for controlling a conveyance operation of a conveying machine that conveys a conveyance article relative to a state of the conveyance article during the conveyance operation, and includes a value function that learns, with respect to a state of an environment defined on the basis of conveyance operation data indicating a state of the conveyance operation of the conveying machine and conveyance article state data indicating the state of the conveyance article that are input to another learned model, a value of selection of an action for controlling the conveyance operation of the conveying machine that can be selected in the state of the environment that is output from the learned model. The distilled model then causes the computer to function so as to execute arithmetic using the value function, with the state of the environment and the action for controlling the conveyance operation of the conveying machine as input, and output, on the basis of an arithmetic result, a value of an action for controlling the conveyance operation of the conveying machine relative to the state of the environment.

According to the present invention, a conveyance operation of a conveying machine can be controlled so that a conveyance article can be conveyed at a higher speed within a range in which no problems occur in the conveyance article.

DETAILED DESCRIPTION OF THE PREFERRED EMBODIMENTS

Figure 1:
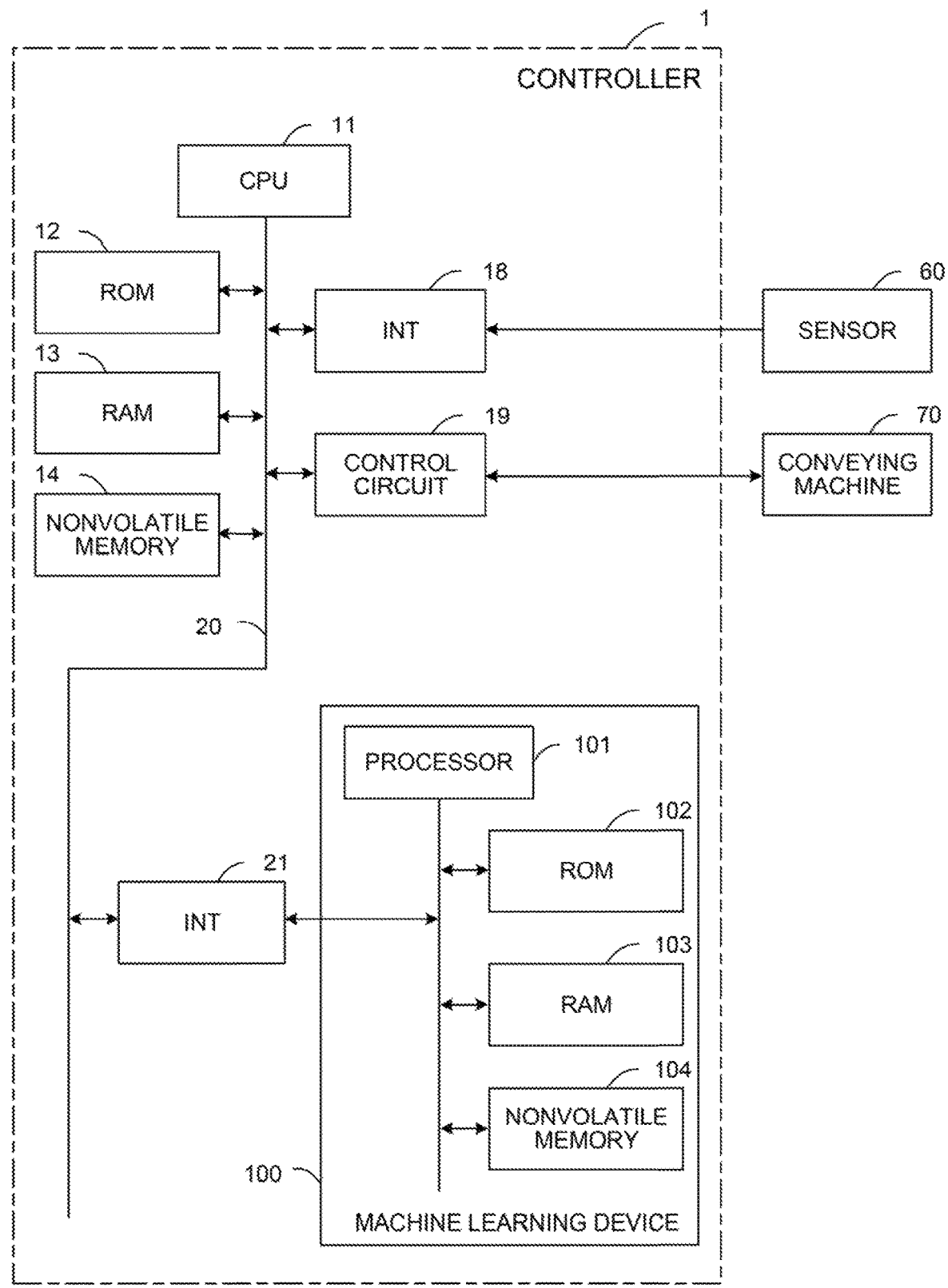
FIG. 1 is a schematic diagram showing a hardware configuration of a controller for a conveying machine according to a first embodiment.

FIG. 1 is a schematic hardware configuration diagram showing main parts of a controller for a conveying machine according to a first embodiment.

A controller 1 for a conveying machine can be embodied as a controller that controls a conveying machine such as a conveyor (not shown) for conveying a conveyance article, a machine (not shown) for conveying a container, a pack, or the like filled with a liquid, an automatic conveying vehicle (not shown) for conveying a conveyance article from a predetermined position to another position, or a robot (not shown), for example. A CPU 11 provided in the controller 1 according to this embodiment is a processor for executing overall control of the controller 1. The CPU 11 reads a system program stored in a ROM 12 via a bus 20, and executes overall control of the controller 1 in accordance with the system program. Temporary calculation data, various data input by an operator via an input unit, not shown in the figure, and so on are stored temporarily in a RAM 13.

A nonvolatile memory 14 is configured as a memory that is backed up by a battery, not shown in the figure, or the like, for example, so that a storage state thereof is maintained even when a power supply of the controller 1 for a conveying machine is switched OFF. Various data (for example, set values used to control a conveyance operation by a conveying machine 70 and so on) input by the operator via the input unit, not shown in the figure, a control program input via an interface, not shown in the figure, and so on are stored in the nonvolatile memory 14. The program and various data stored in the nonvolatile memory 14 may be expanded in the RAM 13 during execution/use. Furthermore, system programs including a well-known analysis program for analyzing the state of the conveyance article on the basis of a detection value detected by a sensor 60, a system program for controlling communication with a machine learning device 100, to be described below, and so on are written to the ROM 12 in advance.

The sensor 60 detects the state of the conveyance article conveyed by the conveying machine. For example, the sensor 60 may be a liquid level sensor or an optical sensor for detecting whether a conveyance article constituted by a liquid has spilled from a container, a load sensor for detecting a center of gravity position of the conveyance article, or image capturing means such as a camera for photographing an attitude or a falling state of the conveyance article. The sensor 60 may also be used to detect the position of the conveyance article conveyed by the conveying machine or the position of the conveying machine itself. The sensor 60 transmits a detection value detected thereby to the CPU 11 via an interface 18.

A control circuit 19 controls a conveyance operation of the conveying machine 70 upon reception of a command from the CPU 11. The control circuit 19 may be configured to be capable of controlling a conveyance speed of the conveying machine 70 (a speed that includes a conveyance direction in a case where the conveying machine 70 is capable of conveying the conveyance article in a plurality of directions), and when the conveying machine 70 is capable of controlling the attitude of the conveyance article, the control circuit 19 may be configured to be capable of controlling the attitude of the conveyance article conveyed by the conveying machine 70. An interface 21 is used to connect the controller 1 to the machine learning device 100.

The machine learning device 100 includes a processor 101 for executing overall control of the machine learning device 100, a ROM 102 storing a system program and so on, a RAM 103 for performing temporary storage during respective processes relating to machine learning, and a nonvolatile memory 104 used to store a learning model and so on. The machine learning device 100 is capable of observing various types of information (the state of the conveyance article, the position of the conveyance article, and the position of the conveying machine, detected by the sensor 60, parameters of the conveyance operation of the conveying machine 70, and so on) that can be acquired by the controller 1 via the interface 21. Further, the controller 1 controls the conveyance operation of the conveying machine 70 upon reception of a command to control the conveyance operation of the conveying machine 70, output by the machine learning device 100.

Figure 2:
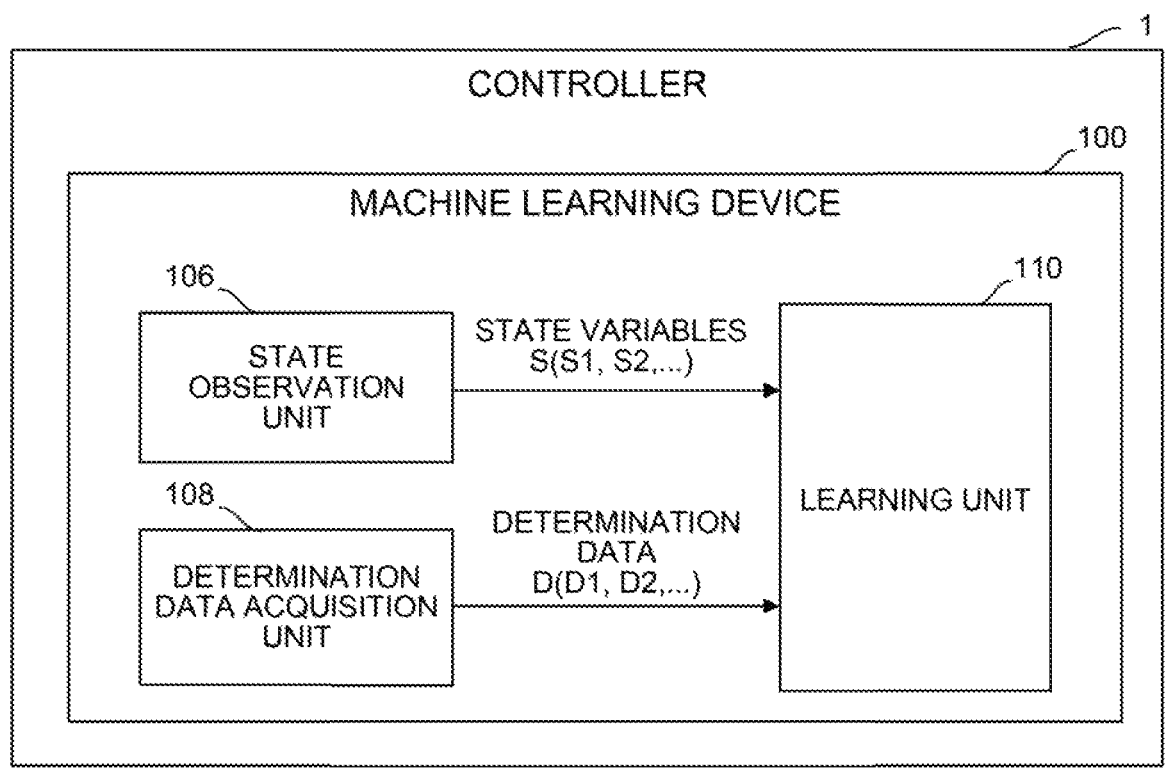
FIG. 2 is a schematic functional block diagram of the controller for a conveying machine according to the first embodiment.

FIG. 2 is a schematic functional block diagram of the controller 1 for a conveying machine and the machine learning device 100 according to the first embodiment.

The machine learning device 100 includes software (a learning algorithm and so on) and hardware (the processor 101 and so on) for learning how to control the conveyance operation of the conveying machine 70 relative to the state of the conveyance article conveyed by the conveying machine 70 through so-called machine learning. What the machine learning device 100 provided in the controller 1 learns corresponds to a model structure expressing a correlation between the state of the conveyance article conveyed by the conveying machine 70 and the conveyance operation of the conveying machine 70.

As indicated by the function blocks in FIG. 2, the machine learning device 100 provided in the controller 1 includes a state observation unit 106, a determination data acquisition unit 108, and learning unit 110. The state observation unit 106 observes state variables S representing a current state of an environment, the state variables S including conveyance operation data S1 indicating the state of the conveyance operation of the conveying machine 70 and conveyance article state data S2 indicating the state of the conveyance article. The determination data acquisition unit 108 acquires determination data D including conveyance speed determination data D1 indicating an appropriateness determination result relating to the conveyance speed at which the conveyance article is conveyed during the conveyance operation of the conveying machine 70 in a case where the conveyance operation is controlled in accordance with a command output from the machine learning device 100 and conveyance article state determination data D2 indicating an appropriateness determination result relating to variation in the state of the conveyance article during the conveyance operation. And the learning unit 110 learns the conveyance operation data S1 and the state of the conveyance article conveyed by the conveying machine in association with each other using the state variables S and the determination data D.

The state observation unit 106 may be configured, for example, as a function of the processor 101 or as software that is stored in the ROM 102 to cause the processor 101 to function as the state observation unit 106. Of the state variables S observed by the state observation unit 106, the conveyance operation data S1 can be acquired as a set of parameters used to control the conveyance operation of the conveying machine 70, for example. As the parameters used to control the conveyance operation of the conveying machine 70, the conveyance speed and acceleration of the conveying machine (a speed and an acceleration including a conveyance direction in a case where the conveying machine 70 is capable of conveying the conveyance article in a plurality of directions) and so on are included, but the parameters used to control the conveyance operation of the conveying machine 70 differ according to the type of the conveying machine 70 (a conveyor, a robot, an automatic conveying vehicle, and so on), and therefore measures may be taken to ensure that appropriate parameters can be acquired in accordance with the respective conveying machines 70.

Parameters relating to control of the conveyance operation of the conveying machine 70, which are reported by an experienced operator, for example, during an initial stage of learning and applied to the controller 1, can be used as the conveyance operation data S1. Further, at a stage where learning has advanced to a certain degree, parameters used to control the conveyance operation of the conveying machine 70 that were determined by the machine learning device 100 during an immediately preceding learning period on the basis of a learning result acquired by the learning unit 110 can be used as the conveyance operation data S1. In this case, the machine learning device 100 may store the determined parameters used to control the conveyance operation of the conveying machine 70 temporarily in the RAM 103 in each learning period, and the state observation unit 106 may acquire the parameters used to control the conveyance operation of the conveying machine 70 that were determined by the machine learning device 100 during the immediately preceding learning period from the RAM 103.

Of the state variables S, data relating to the state of the conveyance article, which are acquired by analyzing the detection value detected by the sensor 60, for example, can be used as the conveyance article state data S2. Here, the state of the conveyance article, indicated by the conveyance article state data S2, may include deviation of the conveyance article from a center of gravity position (an amount of deviation in the center of gravity position of the conveyance article from a central position of a carrying platform or the like), detected by a load sensor, a spillage state of a liquid conveyance article (whether or not a maximum height of a liquid level has exceeded a predetermined height or the like), detected by a liquid level sensor, the attitude of the conveyance article (an amount by which the conveyance article on the carrying platform has varied from an ideal carrying state, an amount by which the conveyance article has tilted, and so on), the falling state of the conveyance article (whether or not a conveyance article has fallen, a number of fallen conveyance articles, and so on), an impact exerted on the conveyance article, and the like.

The determination data acquisition unit 108 may be configured, for example, as a function of the processor 101 or as software that is stored in the ROM 102 to cause the processor 101 to function as the determination data acquisition unit 108. As the determination data D, the determination data acquisition unit 108 can use the conveyance speed determination data D1 serving as an appropriateness determination value of the conveyance speed at which the conveyance article is conveyed during the conveyance operation of the conveying machine 70 in a case where the conveyance operation is controlled. The determination data acquisition unit 108 can use a time (a cycle time) required for the conveyance article to move a predetermined distance set in advance, a distance by which the conveyance article is conveyed over a predetermined time set in advance, and so on as the conveyance speed determination data D1. The conveyance speed determination data D1 serve as an index representing a conveyance efficiency result in a case where the conveyance operation of the conveying machine 70 is controlled under the state variables S.

Further, as the determination data D, the determination data acquisition unit 108 can use the conveyance article state determination data D2 indicating an appropriateness determination result relating to variation in the state of the conveyance article during the conveyance operation of the conveying machine 70 in a case where the conveyance operation is controlled. As the conveyance article state determination data D2, the determination data acquisition unit 108 can use a favorability determination result (for example, variation in the amount of deviation in the center of gravity position of the conveyance article from the central position of the carrying platform, variation in the maximum height of the liquid level, variation in the amount by which the conveyance article on the carrying platform varies from the ideal carrying state, variation in the tilt, variation in the falling state, and so on) based on variation in the conveyance article state data S2 before and after control of the conveyance operation. The conveyance article state determination data D2 serve as an index representing the favorability of the state of the conveyance article in a case where the conveyance operation of the conveying machine 70 is controlled under the state variables S.

The state variables S input simultaneously into the learning unit 110, when considered in terms of the learning period of the learning unit 110, are based on data acquired in an immediately preceding learning period in which the determination data D was acquired. Hence, as learning by the machine learning device 100 provided in the controller 1 progresses, acquisition of the conveyance article state data S2, control of the conveyance operation of the conveying machine based on the conveyance operation data S1, and acquisition of the determination data D are executed repeatedly in an environment.

The learning unit 110 may be configured, for example, as a function of the processor 101 or as software that is stored in the ROM 102 to cause the processor 101 to function as the learning unit 110. The learning unit 110 learns the conveyance operation data S1 relating to the state of the conveyance article in accordance with a desired learning algorithm referred to in general terms as machine learning. The learning unit 110 is capable of executing learning iteratively on the basis of a data set including the state variables S and the determination data D, described above. During an iteration of a learning cycle of the conveyance operation data S1 relating to the state of the conveyance article, the conveyance article state data S2 of the state variables S are acquired from the analysis result of the detection value detected by the sensor 60 in the immediately preceding learning cycle, as described above, and a conveyance operation of the conveying machine 70 determined on the basis of previous learning results is set as the conveyance operation data S1. Further, appropriateness determination results acquired in relation to the conveyance speed and the state of the conveyance article during the current learning period, which is executed after the conveyance operation of the conveying machine 70 is set on the basis of the conveyance operation data S1, are set as the determination data D.

By executing this learning cycle repeatedly, the learning unit 110 can automatically identify a characteristic that implies a correlation between the state of the conveyance article (the conveyance article state data S2) and the conveyance operation of the conveying machine 70 relative to the state. At the start of the learning algorithm, the correlation between the conveyance article state data S2 and the conveyance operation of the conveying machine 70 is substantially unknown, but the learning unit 110 interprets the correlation by identifying the characteristic gradually as learning progresses. Once the correlation between the conveyance article state data S2 and the conveyance operation of the conveying machine 70 has been analyzed to a relatively reliable standard, the learning result output iteratively by the learning unit 110 can be used to select an action (i.e., for decision-making), or in other words to determine the control of the conveyance operation of the conveying machine 70 relative to the current state (in other words, the state in which the conveyance article is conveyed by the conveying machine). To put it another way, as the learning algorithm advances, the learning unit 110 can gradually bring a correlation between the state of the conveyance article conveyed by the conveying machine and an action for controlling the conveyance operation of the conveying machine 70 relative to the state closer to an optimal solution.

As described above, in the machine learning device 100 provided in the controller 1 for a conveying machine, the learning unit 110 learns how to control the conveyance operation of the conveying machine 70 in accordance with a machine learning algorithm using the state variables S observed by the state observation unit 106 and the determination data D acquired by the determination data acquisition unit 108. The state variables S are constituted by the conveyance operation data S1 and the conveyance article state data S2, which are data that can be measured and/or acquired, while the determination data D are determined univocally by the controller 1 by analyzing the detection value detected by the sensor 60. Hence, with the machine learning device 100 provided in the controller 1, a conveyance operation of the conveying machine 70 that corresponds to the state of the conveyance article conveyed by the conveying machine can be determined automatically and accurately without relying on calculation and estimation using the learning result acquired by the learning unit 110.

When the conveyance operation of the conveying machine 70 can be determined automatically without relying on calculation and estimation, appropriate values of the conveyance operation of the conveying machine 70 can be determined quickly simply by ascertaining the state of the conveyance article (the conveyance article state data S2). As a result, the conveyance operation of the conveying machine 70 can be determined efficiently.

Figure 3:
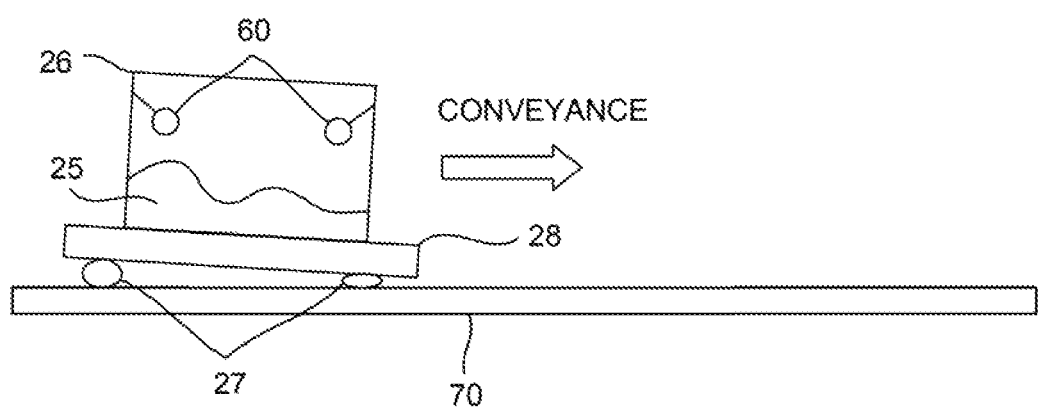
FIG. 3 is a view showing an example of a state in which the conveying machine performs a conveyance operation.

In a first modified example of the machine learning device 100 provided in the controller 1 for a conveying machine, the state observation unit 106 may use a state relating to modification of the attitude of the conveyance article by the conveying machine 70 as the conveyance operation data S1, in addition to the conveyance speed and acceleration of the conveying machine 70. As shown in FIG. 3, for example, depending on the type of the conveying machine 70, tilt control means 27 may be provided to tilt a carrying platform 28 carrying a conveyance article 25 (a container 26 housing a liquid, for example). When this type of conveying machine 70 is used as an object to be observed, a state relating to modification of the attitude of the conveyance article 25 may be added to the conveyance operation data S1.

According to the first modified example, described above, the machine learning device 100 can execute learning on the conveying machine 70, which is capable of attitude control, including not only the conveyance speed and acceleration of the conveying machine but also a state relating to modification of the attitude of the conveyance article, and as a result, the conveyance operation of the conveying machine can be controlled even more efficiently.

In a second modified example of the machine learning device 100 provided in the controller 1 for a conveying machine, the state observation unit 106 may observe, as the state variables S, conveyance position data S3 indicating the position of the conveyance article and/or the conveying machine 70, in addition to the conveyance operation data S1 and the conveyance article state data S2. The position of the conveyance article and/or the conveying machine 70 may be specified using a measurement method employing wireless base stations, beacons, or the like disposed in respective positions, or using position measuring means such as GPS. Alternatively, the position of the conveyance article and/or the conveying machine 70 may be specified using fixed cameras provided in respective positions along a conveyance route. Alternatively, when the conveying machine 70 is a robot, the position of the conveyance article may be specified on the basis of positions of servo motors (rotation angles of the servo motors) for driving respective joints of the robot.

During conveyance of the conveyance article by the conveying machine 70, the conveyance state may vary in accordance with the position of the conveyance article and/or the conveying machine 70 due to an external or internal cause. For example, when the conveying machine 70 is a conveyor or the like, vibration may occur in a specific position due to component wear, and when the conveying machine 70 is an automatic conveying vehicle, vibration may occur or acceleration in a specific direction may be generated in the conveyance article due to unevenness or a slope in a specific position along the route. According to the second modified example, described above, the machine learning device 100 can control the conveyance operation of the conveying machine 70 appropriately in accordance with the position of the conveyance article and/or the conveying machine 70, and in so doing can respond to variation in the conveyance state caused by external or internal causes such as those noted above.

In a third modified example of the machine learning device 100 provided in the controller 1 for a conveying machine, the state observation unit 106 may also observe conveyance article property data S4 indicating properties of the conveyance article as the state variables S. For example, the weight and size of the conveyance article, and when the conveyance article is a liquid, the viscosity and so on of the conveyance article may be used as the properties of the conveyance article.

According to the third modified example, described above, the machine learning device 100 can learn the conveyance operation of the conveying machine 70 in consideration of the properties of the conveyance article.

In a fourth modified example of the machine learning device 100 provided in the controller 1 for a conveying machine, the learning unit 110 can learn how to control the conveyance operation of the conveying machine 70 in the controller 1 using state variables S and determination data D acquired for the controller 1 of each of a plurality of conveying machines 70 executing an identical operation. According to this configuration, the amount of data in the data set including the state variables S and the determination data D acquired over a fixed time can be increased, and therefore a more varied data set can be input, leading to improvements in the speed and reliability with which the conveyance operation of the conveying machine 70 is learned.

Figure 4:
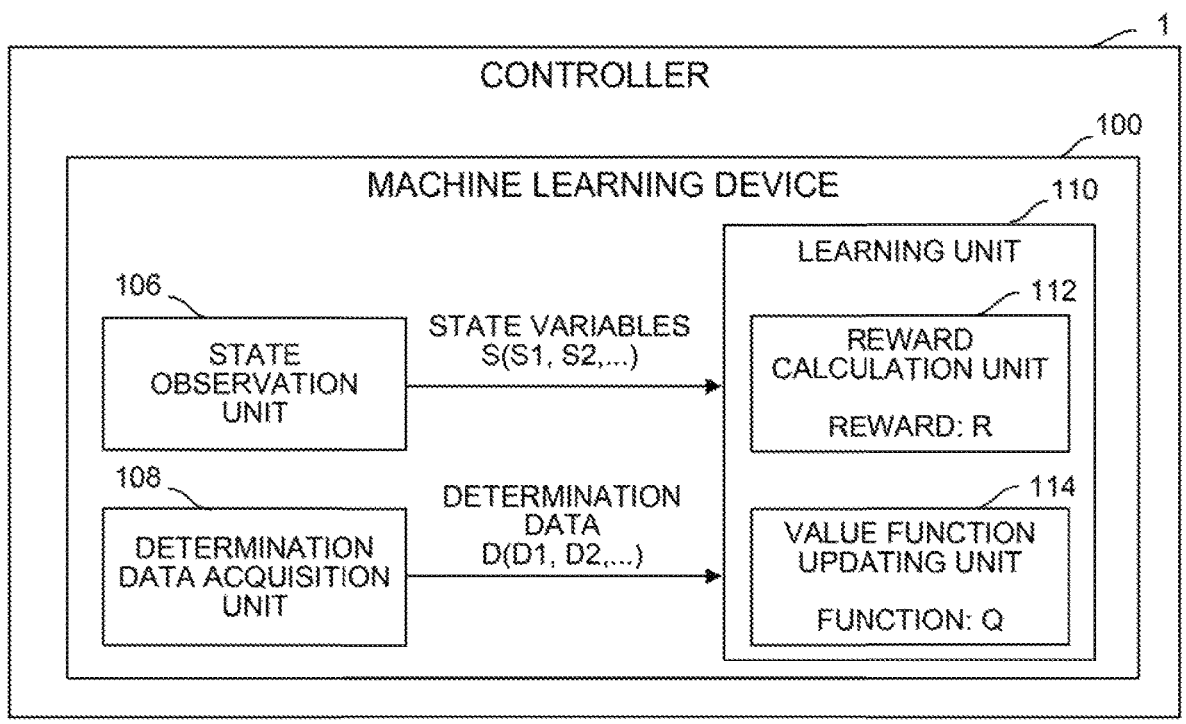
FIG. 4 is a schematic functional block diagram showing an aspect of the controller for a conveying machine.

In the machine learning device 100 having the configuration described above, there are no particular limitations on the learning algorithm executed by the learning unit 110, and a learning algorithm that is well-known in the field of machine learning may be employed. FIG. 4 shows an aspect of the controller 1 shown in FIG. 1, and illustrates a configuration including a learning unit 110 that executes reinforcement learning as an example of the learning algorithm. Reinforcement learning is a method of iteratively executing, by trial and error, a cycle of observing a current state of an environment in which a learning subject exists (i.e. input), executing a predetermined action in the current state (i.e. output), and rewarding the action, and then learning a policy (in the machine learning device according to this application, determining the conveyance operation of the conveying machine 70) with which the total reward is maximized as an optimal solution.

In the machine learning device 100 provided in the controller 1 shown in FIG. 4, the learning unit 110 includes a reward calculation unit 112 for determining a reward R relating to the appropriateness determination results (corresponding to the determination data D used in the learning period following acquisition of the state variables S) acquired in relation to the conveyance speed and the state of the conveyance article when the conveyance operation of the conveying machine 70 is controlled on the basis of the state variables S, and a value function updating unit 114 for updating a function Q representing a value of the conveyance operation of the conveying machine 70 using the determined reward R. By repeatedly updating the function Q using the value function updating unit 114, the learning unit 110 learns how to control the conveyance operation of the conveying machine 70 with respect to the state of the conveyance article conveyed by the conveying machine 70.

An example of the reinforcement learning algorithm executed by the learning unit 110 will now be described.

The algorithm according to this example is also known as Q-learning, which is a learning method in which a state s of an actor and an action a (an increase/reduction in the conveyance speed (which may include the conveyance direction) of the conveyance operation, an increase/reduction in the acceleration, modification of the attitude of the conveyance article, and so on) that can be selected by the actor in the state s are used as independent variables, and a function Q (s, a) representing the value of the action when an action a is selected in the state s is learned. The optimal solution is realized by selecting an action a that results in the highest possible value function Q in the state s. The Q-learning is started in a state where the correlation between the state s and the action a is unknown, and by repeatedly selecting various actions a in an arbitrary state s through trial and error, the value function Q is updated iteratively so as to approach the optimal solution. Here, when the environment (i.e. the state s) varies as a result of selecting an action a in the state s, a reward (i.e. a weighting applied to the action a) r corresponding to the variation is acquired, and by guiding the learning so as to select actions a with which higher rewards r are acquired, the value function Q can be brought close to the optimal solution in a comparatively short time.

An update equation for the value function Q can typically be expressed as shown below in Formula (1). In Formula (1), $s_t$ and $a_t$ respectively denote the state and the action at a time t, and as a result of the action $a_t$, the state varies to $s_{t+1}$. $r_{t+1}$ denotes the reward acquired when the state varies from $s_t$ to $s_{t+1}$. The term maxQ denotes Q when an action a by which the maximum value Q is (considered to be) acquired (at the time t) is performed at a time t+1. α and γ are respectively a learning coefficient and a discount factor, and are set as desired within $0<α≤1$ and $0<γ≤1$.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

When the learning unit 110 executes the Q-learning, the state variables S observed by the state observation unit 106 and the determination data D acquired by the determination data acquisition unit 108 correspond to the state s in the update formula (Formula (1)), an action taken to determine the conveyance operation of the conveying machine 70 relative to the current state (the state of the conveyance article conveyed by the conveying machine) corresponds to the action a of the update equation, and the reward R determined by the reward calculation unit 112 corresponds to the reward r of the update equation. Hence, the value function updating unit 114 repeatedly updates the function Q representing the value of the conveyance operation of the conveying machine 70 relative to the current state by means of Q-learning using the reward R.

For example, the reward R determined by the reward calculation unit 112 can be set as a positive reward R when, after implementing an actual conveyance operation on the basis of conveyance operation parameters determined after determining the conveyance operation of the conveying machine 70, the appropriateness determination results acquired in relation to the conveyance speed and the state of the conveyance article are determined to be "appropriate" (for example, when the distance by which the conveyance article is conveyed over a predetermined time is within an allowable range, when deviation of the center of gravity of the conveyance article is within an allowable range, when a maximum value of the height of the liquid level of the conveyance article decreases following control of the conveyance operation, when none of the conveyance articles fall, and so on), and can be set as a negative reward R when, after implementing an actual conveyance operation on the basis of conveyance operation parameters determined after determining the conveyance operation of the conveying machine 70, the appropriateness determination results acquired in relation to the conveyance speed and the state of the conveyance article are determined to be "inappropriate" (for example, when the distance by which the conveyance article is conveyed over a predetermined time is shorter than the allowable range, when deviation of the center of gravity of the conveyance article is outside the allowable range, when the maximum value of the height of the liquid level of the conveyance article increases following control of the conveyance operation, when a conveyance article falls, and so on). Absolute values of the positive and negative rewards R may be identical or different to each other. Further, the plurality of values included in the determination data D may be combined and determined together as the determination condition.

Furthermore, the appropriateness determination results relating to the conveyance speed and the state of the conveyance article may be set in a plurality of stages rather than in only two patterns, i.e. "appropriate" or "inappropriate". For example, in a case where a minimum value of the allowable range of the distance by which the conveyance article is conveyed over the predetermined time is set at $L_{min}$, a reward R of −5 may be given when a cycle time L in which a predetermined number of components are supplied is $0≤T<L_{min}/5$, a reward R of −2 may be given when $L_{min}/5≤L<L_{min}/2$, and a reward R of −1 may be given when $L_{min}/2≤L≤L_{min}$. Moreover, in the initial stage of learning, $L_{min}$ may be set to be comparatively small, and as learning advances, $L_{min}$ may be increased.

The value function updating unit 114 can hold an action value table on which the state variables S, the determination data D, and the reward R are organized in association with an action value (a numerical value, for example) represented by the function Q. In this case, a behavior in which the value function updating unit 114 updates the function Q is synonymous with a behavior in which the value function updating unit 114 updates the action value table. At the start of the Q-learning, the correlation between the current state of the environment and the conveyance operation of the conveying machine 70 is unknown, and therefore, on the action value table, various state variables S, determination data D, and rewards R are prepared in association with values (functions Q) of randomly determined action values. Note that when the determination data D are known, the reward calculation unit 112 can immediately calculate a reward R corresponding thereto and write the calculated value R in the action value table.

As the Q-learning advances using the reward R corresponding to the appropriateness determination results relating to the conveyance speed and the state of the conveyance article, the learning is guided in a direction for selecting an action by which a higher reward R is acquired, and in response to the state of the environment (in other words, the state variables S and the determination data D), which varies as a result of executing the selected action in the current state, the value (the function Q) of the action value relating to the action implemented in the current state is rewritten so as to update the action value table. By executing this updating operation repeatedly, the value (the function Q) of the action value displayed on the action value table is rewritten to a steadily larger value as the appropriateness of the action increases. Accordingly, the correlation between the current state of the environment (the state of the conveyance article conveyed by the conveying machine), which was initially unknown, and the action (determining the conveyance operation of the conveying machine 70) performed in relation thereto is gradually ascertained. In other words, by updating the action value table, the relationship between the state of the conveyance article conveyed by the conveying machine and the conveyance operation of the conveying machine 70 gradually approaches the optimal solution.

Figure 5:
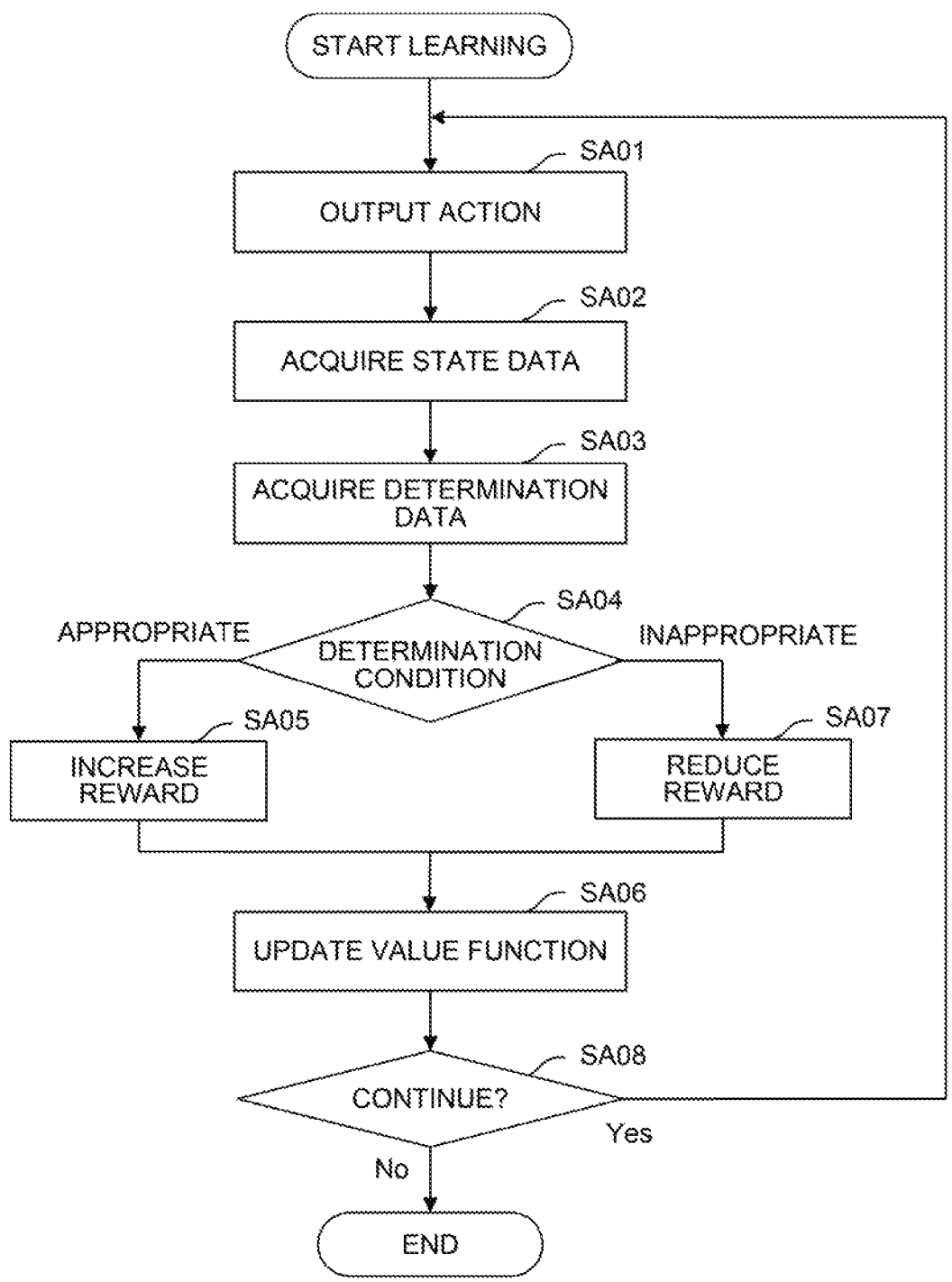
FIG. 5 is a schematic flowchart showing an aspect of a machine learning method.

Referring to FIG. 5, a flow of the Q-learning executed by the learning unit 110, as described above (in other words, an aspect of a machine learning method), will be described in further detail.

First, in step SA01, the value function updating unit 114 selects a conveyance operation of the conveying machine 70 randomly as the action to be performed in the current state, the current state being indicated by the state variables S observed by the state observation unit 106, while referring to the action value table at that point. Next, in step SA02, the value function updating unit 114 acquires the state variables S of the current state, observed by the state observation unit 106, and in step SA03, the value function updating unit 114 acquires the determination data D of the current state, acquired by the determination data acquisition unit 108. Next, in step SA04, the value function updating unit 114 determines whether or not the conveyance operation of the conveying machine 70 is appropriate on the basis of the determination data D. When the conveyance operation is appropriate, the value function updating unit 114 applies the positive reward R determined by the reward calculation unit 112 to the update equation for the function Q in step SA05, and then updates the action value table in step SA06 using the state variables S and determination data D of the current state, the reward R, and the value (the updated function Q) of the action value. When it is determined in step SA04 that the conveyance operation of the conveying machine 70 is inappropriate, the negative reward R determined by the reward calculation unit 112 is applied to the update equation for the function Q in step SA07, whereupon the action value table is updated in step SA06 using the state variables S and determination data D of the current state, the reward R, and the value (the updated function Q) of the action value.

By executing steps SA01 to SA07 repeatedly, the learning unit 110 iteratively updates the action value table, thereby advancing learning of the conveyance operation of the conveying machine 70. Note that the processing for determining the reward R and the processing for updating the value function in steps SA04 to SA07 are executed on the respective data included in the determination data D.

Figure 6A:
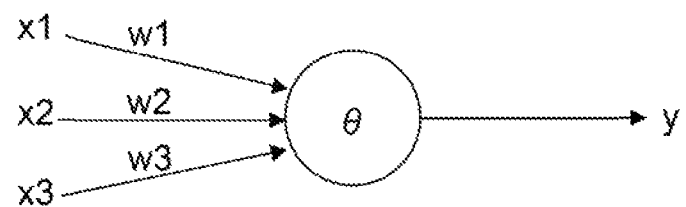
FIG. 6A is a view illustrating a neuron.
Figure 6B:
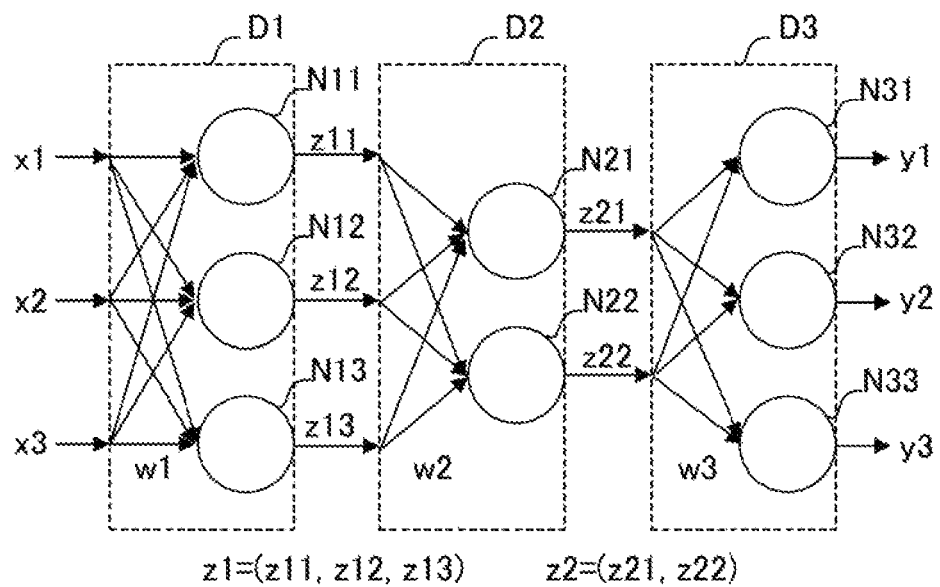
FIG. 6B is a view illustrating a neural network.

A neural network, for example, can be applied to advance the reinforcement learning described above. FIG. 6A is a schematic view showing a model of a neuron. FIG. 6B is a schematic view showing a model of a three-layer neural network constructed by combining neurons of the type shown in FIG. 6A. The neural network can be constructed by arithmetic devices, storage devices, and so on serving as models of neurons, for example.

The neuron shown in FIG. 6A outputs a result y in response to a plurality of inputs x (here, for example, inputs $x_1$ to $x_3$). A weighting w ($w_1$ to $w_3$) is applied to each input $x_1$ to $x_3$ in accordance with the corresponding input x. As a result, the neuron outputs the result y in the form of a following equation (2). Note that in Formula (2), the input x, the result y, and the weighting w are all vectors. Further, θ is a bias and $f_k$ is an activation function.

$$y = f_k(\Sigma_{i=1}^{n} x_i w_i - \theta) \qquad (2)$$

In the three-layer neural network shown in FIG. 6B, a plurality of inputs x (here, for example, inputs x1 to x3) are input from a left side, and results y (here, for example, results y1 to y3) are output from a right side. In the example shown in the figure, corresponding weightings (expressed collectively as w1) are multiplied respectively by the inputs x1, x2, x3, whereupon the individual inputs x1, x2, x3 are input into all of three neurons N11, N12, N13.

In FIG. 6B, respective outputs of the neurons N11 to N13 are expressed collectively as z1. z1 may be considered to represent feature vectors obtained by extracting feature amounts of input vectors. In the example shown in the figure, corresponding weightings (expressed collectively as w2) are multiplied respectively by the feature vectors z1, whereupon the individual feature vectors z1 are input into both of two neurons N21, N22. The feature vectors z1 represent a feature between weighting w1 and weighting w2.

In FIG. 6B, respective outputs of the neurons N21 and N22 are expressed collectively as z2. z2 may be considered to represent a feature vectors obtained by extracting feature amounts of the feature vectors z1. In the example shown in the figure, corresponding weightings (expressed collectively as w3) are multiplied respectively by the feature vectors z2, whereupon the individual feature vectors z2 are input into all of three neurons N31, N32, N33. The feature vectors z2 express a feature between the weighting w2 and the weighting w3. Finally, the neurons N31 to N33 respectively output results y1 to y3.

Note that a so-called deep learning method using a neural network having more than three layers may also be employed.

In the machine learning device 100 provided in the controller 1, the learning unit 110 can output the value (the result y) of an action performed in the state by implementing multilayer-structure arithmetic in accordance with a neural network described above using the neural network as the value function of the Q-learning and with the state variables S and the action a as the input x. Note that the neural network includes a learning mode and a value prediction mode as operating modes so that, for example, the weighting w can be learned in the learning mode using a learning data set and the value of the action can be determined in the value prediction mode using the learned weighting w. Further, in the value prediction mode, detection, classification, inference, and so on can also be implemented.

The value function learned by the learning unit 110 of the machine learning device 100 can be used as a program module serving as a part of machine learning-related software constituted by a learned model. The learned model of the present invention can be used by a computer having a processor such as a CPU or a GPGPU, and a memory. More specifically, in response to a command from the learned model stored in the memory of the computer, the processor implements arithmetic using the state of the environment and a control action relating to the conveyance operation of the conveying machine as input, and on the basis of the arithmetic result, outputs the value of the control action implemented in relation to the conveyance operation of the conveying machine relative to the state of the environment. The learned model of the present invention can also be copied to another computer via an external storage medium, a network, or the like and used therein.

Furthermore, when the learned model of the present invention is copied to another computer and used in a new environment, additional learning can be performed with respect to the learned model on the basis of new state variables and determination data acquired in the new environment. In this case, a learned model (referred to hereafter as a derived model) derived from the learned model in accordance with the new environment can be acquired. The derived model of the present invention is identical to the original learned model in outputting a value of selection of an action in a predetermined state, but differs therefrom in outputting a result adapted to a newer environment than that of the original learned model. The derived model may likewise be copied to another computer via an external storage medium, a network, or the like and used therein.

It is also possible to create and use a learned model (referred to hereafter as a distilled model) that is acquired by learning the model from scratch in another machine learning device using the output (the value) acquired from the input (selection of an action in a predetermined state) of the machine learning device into which the learned model of the present invention is incorporated (this type of learning process is known as distillation). In distillation, the original learned model is known as a teacher model and the newly created distilled model is known as a student model. The distilled model is typically smaller in size than the original learned model, but is still capable of producing an equivalent accuracy to the original learned model, and is therefore suitable for distribution to another computer via an external storage medium, a network, or the like.

The above configuration of the controller 1 for a conveying machine can be described as a machine learning method (or software) executed by the processor 101. This machine learning method is a machine learning method for learning how to control the conveyance operation of the conveying machine 70, including the steps of having a CPU of a computer:

observe the conveyance operation data S1 and the conveyance article state data S2 as the state variables S representing the current state of the environment in which the conveyance operation of the conveying machine 70 is controlled;

acquire the determination data D indicating the appropriateness determination results acquired in relation to the conveyance speed and the state of the conveyance article as results of control of the conveying machine 70 based on the determined conveyance operation of the conveying machine 70; and learn the conveyance article state data S2 and the conveyance operation of the conveying machine 70 in association with each other using the state variables S and the determination data D.

Figure 7:
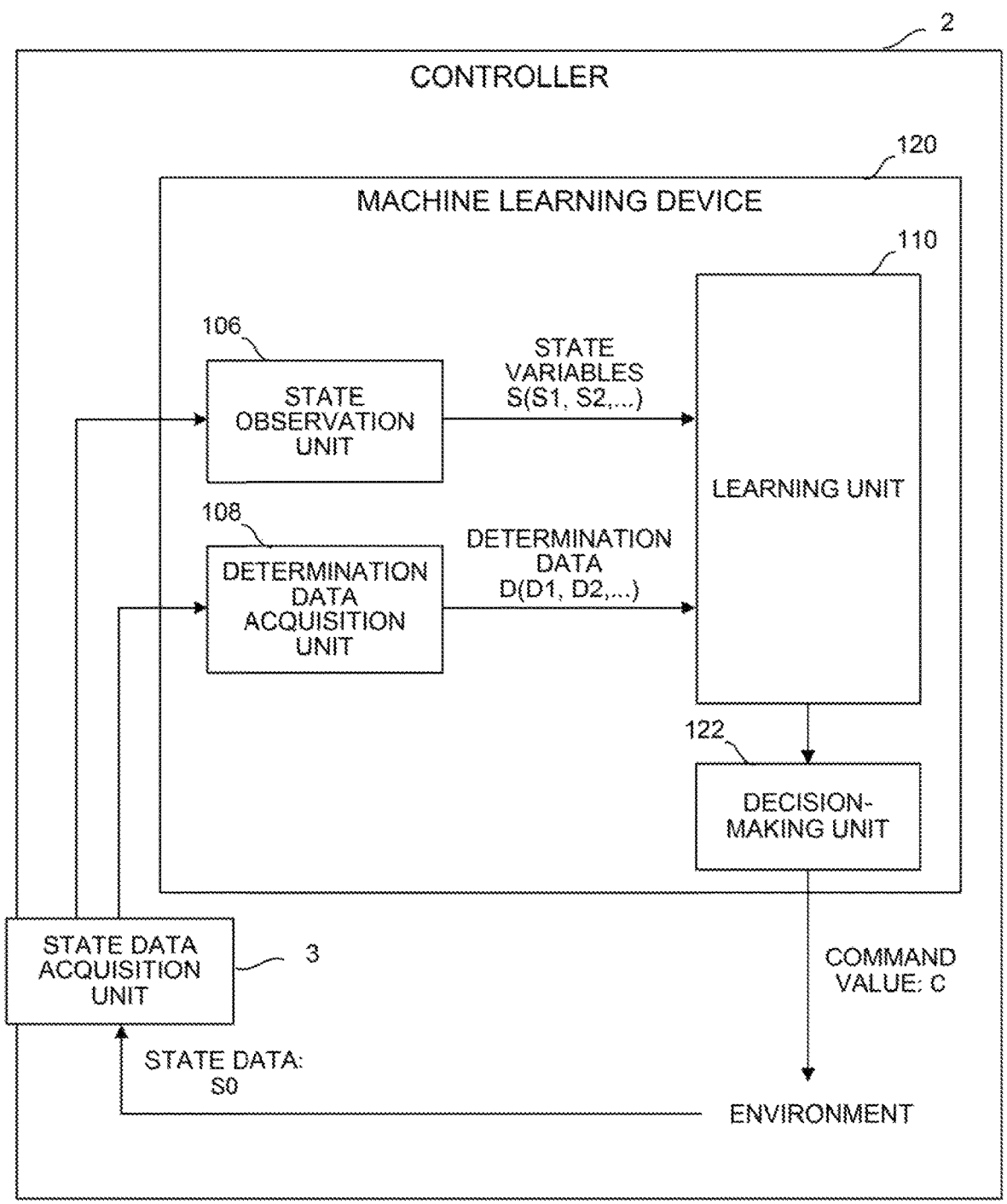
FIG. 7 is a schematic functional block diagram showing a controller for a conveying machine according to a second embodiment.

FIG. 7 shows a controller 2 for a conveying machine according to a second embodiment.

The controller 2 for a conveying machine according to the second embodiment has a similar hardware configuration to the first embodiment, described above. The controller 2 includes a machine learning device 120, and a state data acquisition unit 3 for acquiring the conveyance operation data S1 and the conveyance article state data S2 of the state variables S observed by the state observation unit 106 as state data S0. The state data acquisition unit 3 can acquire the state data S0 from the respective units of the controller 2, the analysis result of the detection value detected by the sensor 60, values acquired by the conveying machine 70, data input as appropriate by the operator, and so on.

The machine learning device 120 of the controller 2 includes software (an arithmetic algorithm and so on) and hardware (the processor 101 and so on) for outputting a conveyance operation of the conveying machine 70 determined on the basis of the learning result as a command for the controller 2 in addition to the software (the learning algorithm and so on) and hardware (the processor 101 and so on) for learning the conveyance operation of the conveying machine 70 through machine learning. The machine learning device 120 of the controller 2 may also be configured such that all software, including the learning algorithm, the arithmetic algorithm, and so on, is executed by a single shared processor.

A decision-making unit 122 may be configured, for example, as a function of the processor 101 or as software that is stored in the ROM 102 to cause the processor 101 to function as the decision-making unit 122. The decision-making unit 122 generates a command value C including a command to determine the conveyance operation of the conveying machine 70 relative to the state of the conveyance article conveyed by the conveying machine on the basis of the result learned by the learning unit 110, and outputs the generated command value C. When the decision-making unit 122 outputs the command value C to the controller 2 of the conveying machine, the state of the environment varies in response thereto. The command value C output by the decision-making unit 122 may include, for example, a command to modify and/or specify the conveyance speed (including the conveyance direction as required) of the conveying machine 70, and a command to modify and/or specify the acceleration (including the acceleration direction as required) of the conveying machine 70. The command value C output by the decision-making unit 122 may also include, for example, a command to modify and/or specify the attitude of the conveyance article conveyed by the conveying machine 70.

In the next learning period, the state observation unit 106 observes the state variables S following variation thereof after the decision-making unit 122 outputs the command value C to the environment. The learning unit 110 then learns how to control the conveyance operation of the conveying machine 70 by updating the value function Q (i.e. the action value table), for example, using the varied state variables S. Note that at this time, the state observation unit 106 may observe the conveyance operation data S1 from the RAM 103 of the machine learning device 120, as described in the first embodiment, rather than acquiring the conveyance operation data S1 from the state data S0 acquired by the state data acquisition unit 3.

The decision-making unit 122 outputs a command value C for setting the conveyance operation of the conveying machine 70 determined on the basis of the learning result to the controller 2 of the conveying machine. By implementing this control period repeatedly, the machine learning device 120 advances learning of the conveyance operation of the conveying machine 70, and as a result, the reliability of the self-determined conveyance operation of the conveying machine 70 gradually improves.

With the machine learning device 120 provided in the controller 2 for a conveying machine having the configuration described above, identical effects to those of the machine learning device 100 (FIGS. 2 and 4) are obtained. With the machine learning device 120 in particular, the state of the environment can be varied by the output of the decision-making unit 122. With the machine learning device 100, meanwhile, a function corresponding to a decision-making unit for reflecting the learning result acquired by the learning unit 110 in the environment can be provided in an external device.

Figure 8:
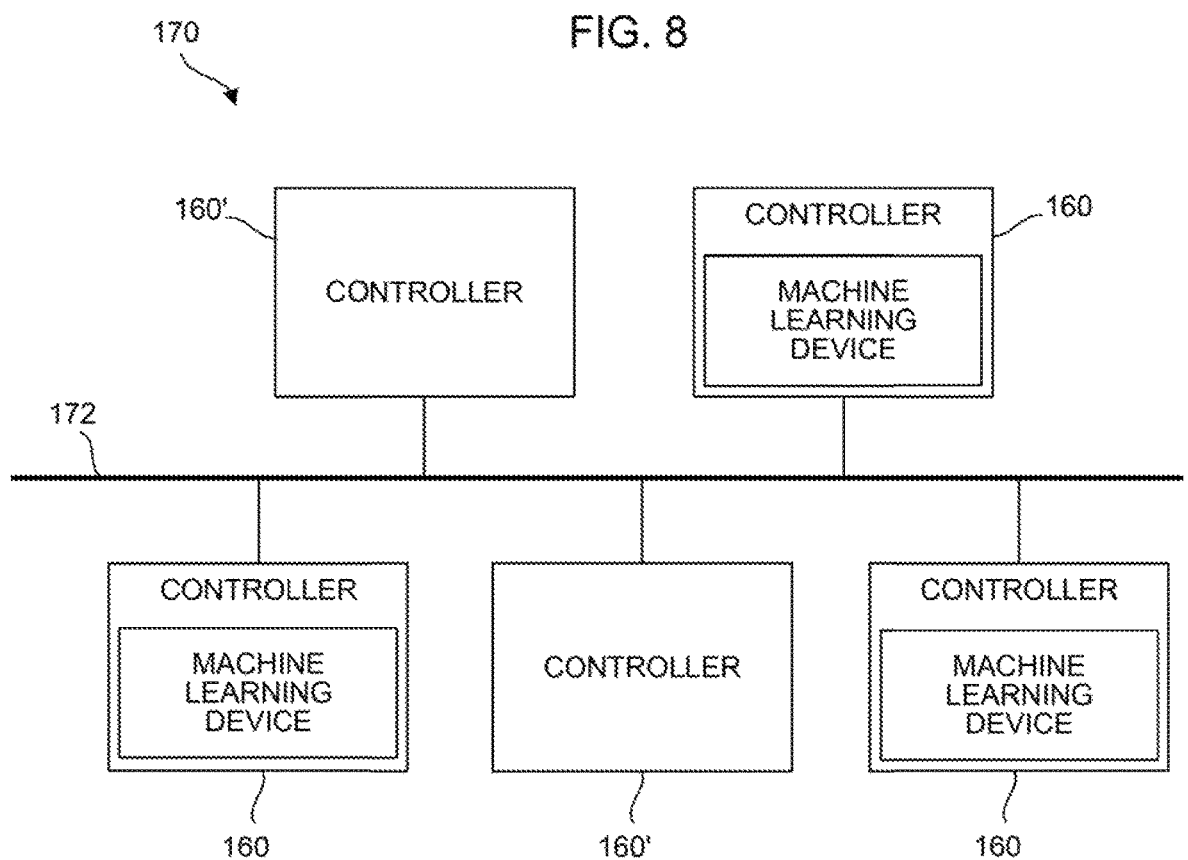
FIG. 8 is a schematic functional block diagram showing an aspect of a system into which a controller for a conveying machine is incorporated.

FIG. 8 shows a system 170 according to an embodiment that includes a controller 160 for a conveying machine.

The system 170 includes a plurality of controllers 160, 160' that implement at least an identical operation, and a wired/wireless network 172 that connects the controllers 160, 160' to each other. At least one of the plurality of controllers 160, 160' is configured as the controller 160 that includes the machine learning device 120 described above. The system 170 may also include the controller 160' that does not include the machine learning device 120. The controllers 160, 160' include mechanisms required for operations having identical aims.

In the system 170 configured as described above, the controller 160 having the machine learning device 120, among the plurality of controllers 160, 160' for a conveying machine, can determine the control of the conveyance operation of the conveying machine 70 relative to the state of the conveyance article conveyed by the conveying machine 70 automatically and accurately, without relying on calculation and estimation, using the learning result acquired by the learning unit 110. Further, the machine learning device 120 of at least one controller 160 can learn how to control the conveyance operation of the conveying machine 70, which is common to all of the controllers 160, 160', on the basis of the state variables S and the determination data D acquired in relation to each of the plurality of other controllers 160, 160', and can share the learning result among all of the controllers 160, 160'. With the system 170, therefore, a more varied data set (including the state variables S and the determination data D) can be input, leading to improvements in the speed and reliability with which control of the conveyance operation of the conveying machine 70 is learned.

Figure 9:
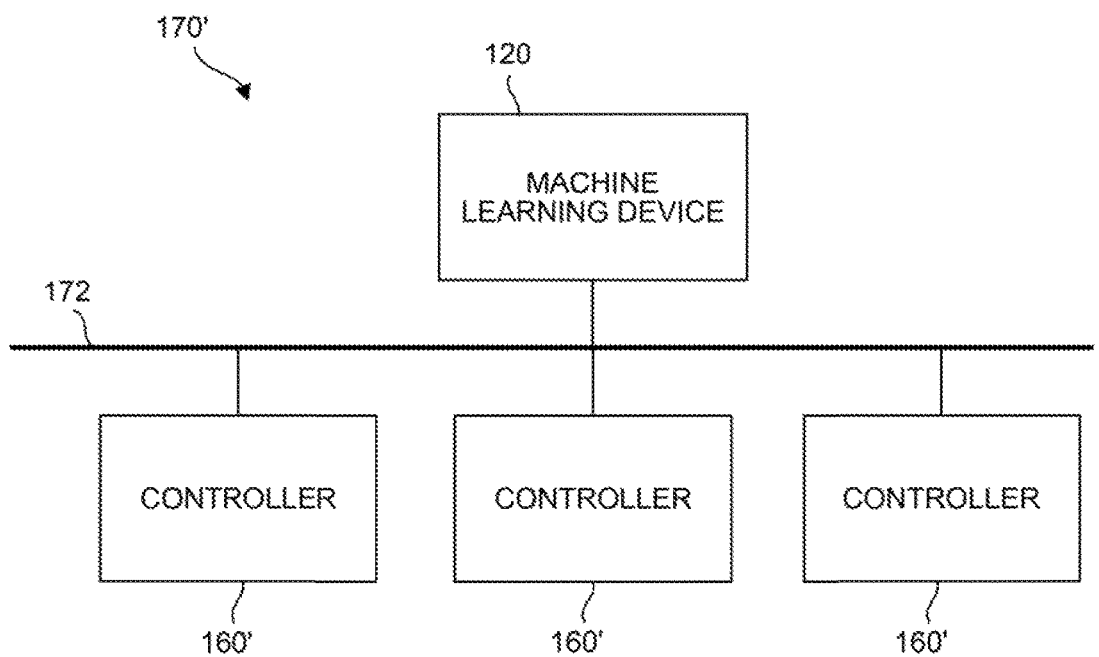
FIG. 9 is a schematic functional block diagram showing another aspect of a system into which a controller for a conveying machine is incorporated.

FIG. 9 shows a system 170' according to another embodiment including the controller 160' for a conveying machine.

The system 170' includes the machine learning device 120 (or 100), a plurality of controllers 160' having identical mechanical configurations, and the wired/wireless network 172 that connects the controllers 160' and the machine learning device 120 (or 100) to each other.

In the system 170' configured as described above, the machine learning device 120 (or 100) can learn how to control the conveyance operation of the conveying machine 70 relative to the state of the conveyance article conveyed by the conveying machine, which is shared by all of the controllers 160', on the basis of the state variables S and the determination data D acquired in relation to each of the plurality of controllers 160', and using the learning result, the machine learning device 120 (or 100) can determine the conveyance operation of the conveying machine 70 in relation to the state of the conveyance article conveyed by the conveying machine automatically and accurately, without relying on calculation and estimation.

The system 170' may be configured such that the machine learning device 120 (or 100) exists in a cloud server or the like provided on the network 172. With this configuration, the required number of controllers 160' can be connected to the machine learning device 120 (or 100) as required, regardless of the time and the respective locations of the plurality of controllers 160'.

At an appropriate time following the start of learning by the machine learning device 120 (or 100), an operator of the system 170, 170' can determine whether or not the degree to which the machine learning device 120 (or 100) has learned how to control the conveyance operation of the conveying machine 70 (in other words, the reliability of control of the conveyance operation of the conveying machine 70) has reached a required level.

The conveying machine 70 controlled by the controller 1 (or 2 or 160) for a conveying machine according to the present invention is used to convey a conveyance article, and may be configured such that the conveyance speed thereof can be controlled and the state of the conveyance article can be detected using a sensor.

Figure 10:
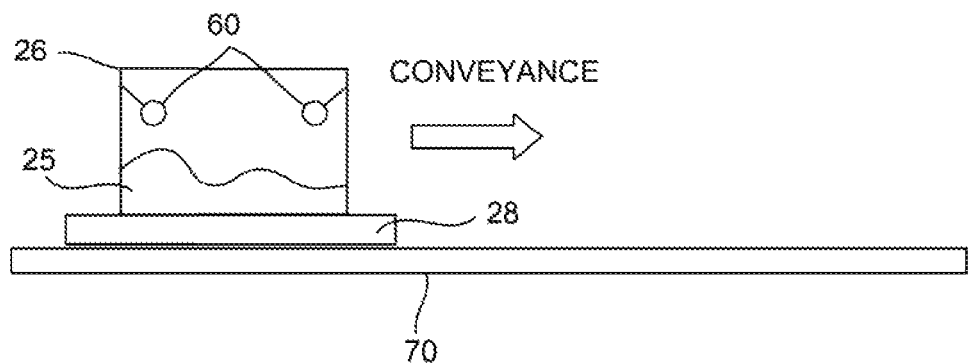
FIG. 10 is a view showing an example of a conveying machine controlled by the controller.

As shown in FIG. 10, for example, the conveying machine 70 (a conveyor) may be used to convey a container 26 that is carried on a carrying platform 28 and filled with a liquid 25. In this conveying machine 70, a liquid level sensor such as a float switch disposed in the container, for example, may be used as the sensor 60 for detecting the state of the conveyance article (the liquid 25).

The machine learning device 100 (or 120) implements learning by detecting the height of the liquid level detected by the sensor 60 as the state of the liquid 25 (the conveyance article), and applying a negative reward when a maximum value of the height of the liquid level exceeds a predetermined allowable value set in advance, and as a result, the conveyance speed and acceleration can be controlled so as to maximize the cycle time of the conveyance operation within a range in which the liquid 25 serving as the conveyance article does not spill out of the container 26.

Figure 11:
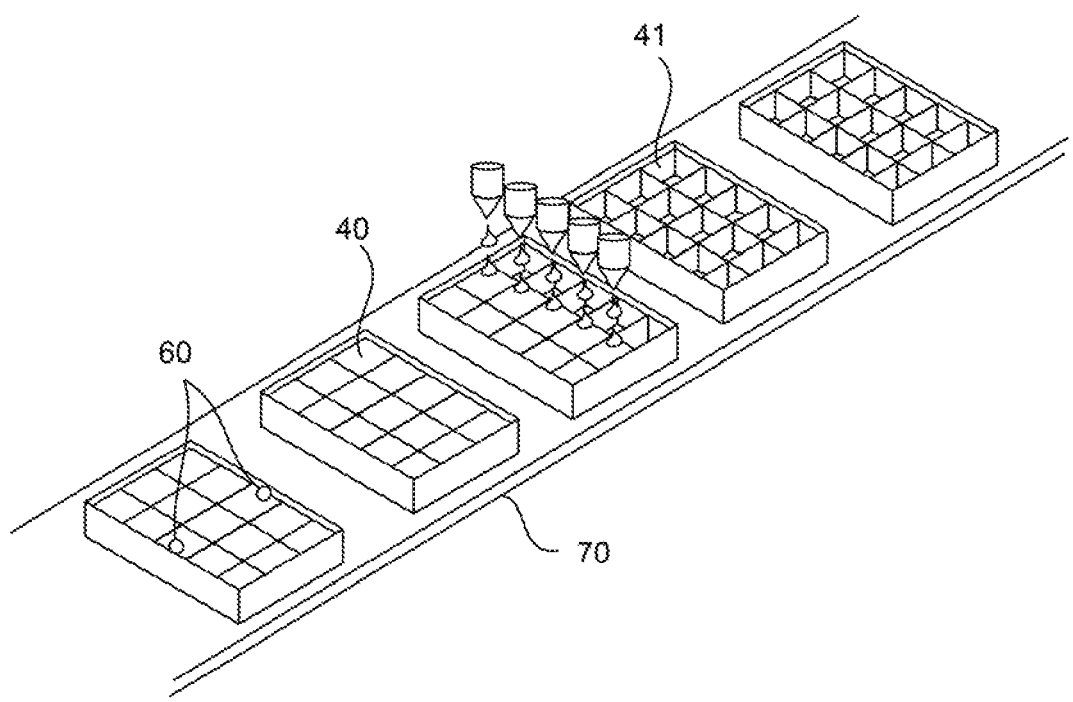
FIG. 11 is a view showing an example of a conveying machine controlled by the controller.

Further, as shown in FIG. 11, the present invention may be applied similarly to a conveying machine 70 for conveying a plurality of containers 41 filled with liquid 40. In this case, a liquid level sensor such as a float switch disposed in each of the plurality of containers 41 may be used as the sensor 60 (FIG. 1), and in this case, for example, an appropriateness determination result may be calculated in relation to the state of the conveyance article (the liquid 40) from the height of the liquid level detected in each of the containers 41 by the respective sensors 60, whereupon the results are integrated in order to determine the reward.

Figure 12:
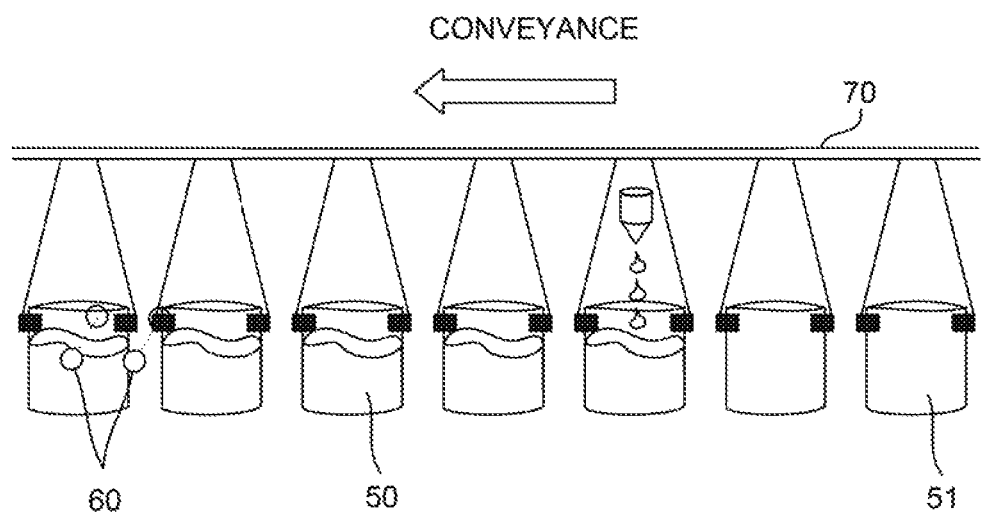
FIG. 12 is a view showing an example of a conveying machine controlled by the controller.

As shown in FIG. 12, the present invention may also be applied to a conveying machine 70 that conveys a liquid 50 charged into a hanging transparent pack 51. In this conveying machine 70, as the sensor 60 for detecting the state of the conveyance article (the liquid 50), an optical sensor 60, for example, may be provided in each of left and right positions through which the pack 51 passes so that the height of the liquid level can be detected according to whether or not the liquid 50 blocks light.

The machine learning device 100 (or 120) implements learning by detecting the height of the liquid level detected by the sensor 60 as the state of the conveyance article (the liquid 50), and applying a negative reward when the maximum value of the height of the liquid level exceeds a predetermined allowable value set in advance, and as a result, the conveyance speed and acceleration can be controlled so as to maximize the cycle time of the conveyance operation within a range in which the liquid 50 serving as the conveyance article does not spill out of the pack 51.

Figure 13:
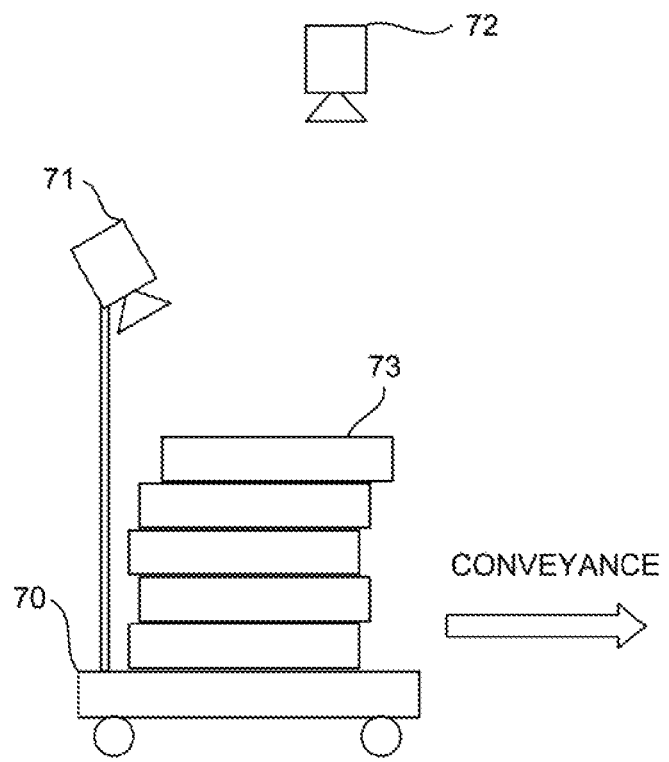
FIG. 13 is a view showing an example of a conveying machine controlled by the controller.

The controller according to the present invention is also sufficiently effective when applied to an automatic conveying machine such as that shown in FIG. 13.

In this conveying machine 70, a camera 71 disposed on the conveying machine 70 itself, fixed cameras 72 disposed in respective positions on the conveyance route, and so on may be used as the sensor 60. The respective cameras photograph conveyance articles in a stacked state, and by analyzing the photographed images, the carried state (deviation from an ideal state) of conveyance articles 73 (in the example shown in FIG. 13, unsecured boxes) can be acquired and used as data indicating the state of the conveyance articles 73 in order to detect whether or not any of the conveyance articles 73 has fallen or the like. In so doing, the conveyance speed and acceleration can be controlled so as to maximize the cycle time of the conveyance operation within a range in which this problem does not occur. Moreover, by detecting the position of the conveying machine 70 using the fixed camera 72 serving as the sensor 60, the detected position can be observed as the conveyance position data S3 and used during learning.

Figure 14:
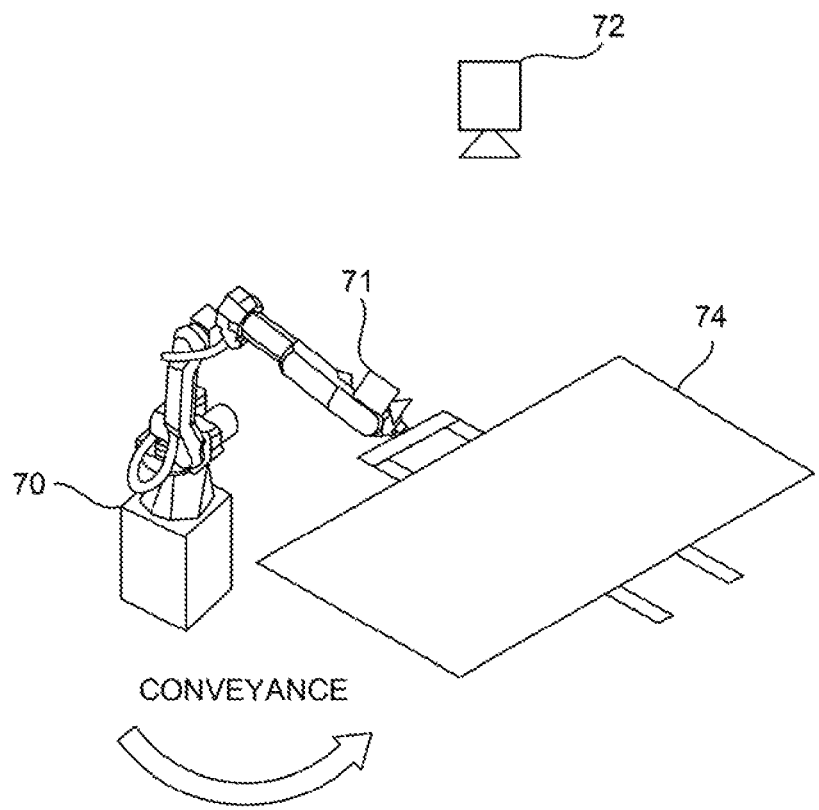
FIG. 14 is a view showing an example of a conveying machine controlled by the controller.

As shown in FIG. 14, the controller according to the present invention can also be used when switching a conveyance article carried by a robot.

In this conveying machine 70, a camera 71 disposed on the conveying machine 70 (in the example shown in FIG. 14, a robot) itself, fixed cameras 72 disposed in the vicinity of the conveying machine 70, and so on may be used as the sensor 60. By photographing a conveyance article 74 (in the example shown in FIG. 14, a panel) gripped by a hand of the robot or carried on an arm, and analyzing the photographed image, the carried state (deviation of the attitude or center of gravity of the conveyance article 74, and so on) of conveyance article 74 can be acquired and used as data indicating the state of the conveyance article 74 in order to detect whether or not the conveyance article 74 has fallen or the like. In so doing, the conveyance speed and acceleration can be controlled so as to maximize the cycle time of the conveyance operation within a range in which this problem does not occur. Moreover, a command to modify the attitude or the like of the conveyance article can be issued during control of the conveyance operation of the conveying machine 70 (the robot).

Figure 15:
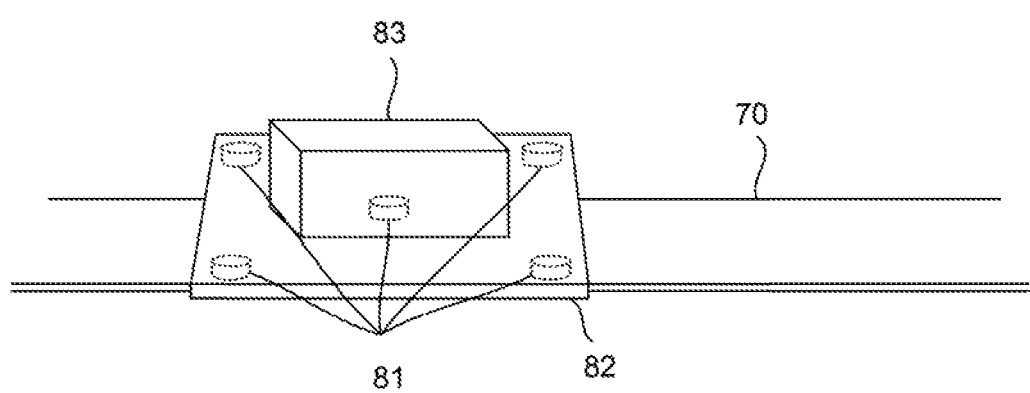
FIG. 15 is a view showing an example of a conveying machine controlled by the controller.

The conveying machine 70 controlled by the controller according to the present invention may also be a conveying machine 70 (a conveyor) such as that shown in FIG. 15, which conveys a conveyance article 83 carried on a carrying platform 82 having a load sensor 81 (a force sensor) as the sensor 60.

Figure 16:
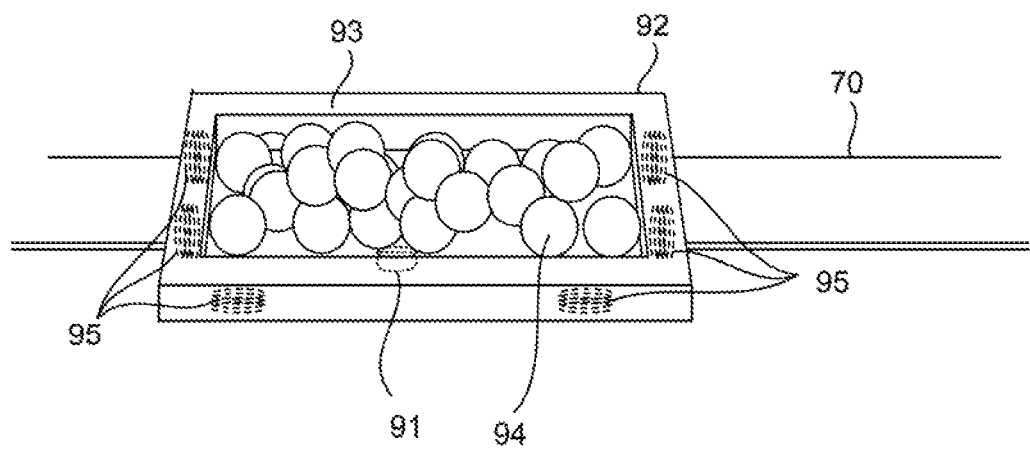
FIG. 16 is a view showing an example of a conveying machine controlled by the controller.

Furthermore, the conveying machine 70 controlled by the controller according to the present invention may be a conveyor such as that shown in FIG. 16, which conveys a plurality of conveyance articles 94 housed in a housing container 93 that is carried on a carrying platform 92 having a load sensor 91 (a force sensor). In this conveying machine 70 (conveyor), a load sensor 91 disposed on the carrying platform 92 can be used as the sensor 60 for detecting the state of the conveyance article 94. Note that in FIG. 16, a reference numeral 95 represents an elastic body such as a spring provided on the carrying platform 92.

The machine learning device 100 (or 120) implements learning by detecting deviation of the carrying position or center of gravity of the conveyance article 94 as the state of the conveyance article 94 from the manner in which force is exerted thereon, as detected by the sensor 60 (the load sensor 91), and applying a negative reward when the deviation increases, and as a result, the conveyance speed and acceleration can be controlled so as to maximize the cycle time of the conveyance operation within a range in which the conveyance article 94 does not shift while carried on the carrying platform 92 or fall out of the housing container 93.

Embodiments of the present invention were described above, but the present invention is not limited only to the above exemplary embodiments, and may be implemented in various forms obtained by applying appropriate modifications thereto.

For example, the learning algorithm executed by the machine learning device 100, 120, the arithmetic algorithm executed by the machine learning device 120, the control algorithm executed by the controller 1, 2 for a conveying machine, and so on are not limited to those described above, and various other algorithms may be employed.

Further, in the above embodiments, the controller 1 (or 2) for a conveying machine and the machine learning device 100 (or 120) are described as devices having different CPUs, but the machine learning device 100 (or 120) may be realized by the CPU 11 provided in the controller 1 (or 2) for a conveying machine and the system program stored in the ROM 12.

The invention claimed is:

1. A controller for controlling a conveying machine that conveys a conveyance article, the controller comprising:
   a processor that learns how to control a conveyance operation of the conveying machine relative to a state of the conveyance article, wherein the processor is configured to:
   control the conveying machine to convey the conveyance article;
   observe when the conveying machine conveys the conveyance article, as state variables representing a current state of an environment,
   conveyance operation data indicating a state of the conveyance operation of the conveying machine, and conveyance article state data indicating the state of the conveyance article including at least one of position of the conveyance article, or position of liquid within the conveyance article;
   acquire, as determination data, conveyance speed determination data indicating an appropriateness determination result of a conveyance speed of the conveyance article, and conveyance article state determination data indicating an appropriateness determination result of a variation in the state of the conveyance article, the variation including at least one of movement of the position of the conveyance article with respect to the machine as a result of the conveyance, or movement of the position of the liquid within the conveyance article as a result of the conveyance;
   learn an association between the conveyance operation data and the conveyance article state data by using the state variables and the determination data in order to optimize conveyance speed while maintaining an allowable variation in the state of the conveyance article; and
   control the conveying machine based on the optimized conveyance speed.

2. The controller according to claim 1, wherein the conveyance operation data further include a state of attitude modification of the conveyance article.

3. The controller according to claim 1, wherein the processor is further configured to observe, as the state variables, conveyance position data indicating a position of the conveying machine or the conveyance article.

4. The controller according to claim 1, wherein the processor is further configured to observe, as the state variables, conveyance article property data indicating a property of the conveyance article.

5. The controller according to claim 1, wherein the processor is further configured to:
    determine a reward in relation to the appropriateness determination results; and
    update a function of the conveyance operation of the conveying machine relative to the state of the conveyance article by using the reward.

6. The controller according to claim 1, wherein the processor is further configured to calculate the state variables and the determination data in a multilayer structure.

7. The controller according to claim 1, wherein the processor is further configured to output a command value for determining the control of the conveyance operation of the conveying machine on the basis of a learning result.

8. The controller according to claim 1, wherein the processor is further configured to learn how to control the conveyance operation of the conveying machine in each of the plurality of controllers by using the state variables and the determination data acquired in relation to each of the plurality of controllers.

9. The controller according to claim 1, wherein the machine learning device exists in a cloud server.

10. A machine learning device for learning how to control a conveyance operation of a conveying machine that conveys a conveyance article in relation to a state of the conveyance article during the conveyance operation, the machine learning device comprising:
    a processor configured to:
        observer when the conveying machine conveys the conveyance article, as state variables representing a current state of an environment, conveyance operation data indicating a state of the conveyance operation of the conveying machine, and conveyance article state data indicating the state of the conveyance article including at least one of position of the conveyance article, or position of liquid within the conveyance article;
        acquire, as determination data, conveyance speed determination data indicating an appropriateness determination result of a conveyance speed of the conveyance article, and conveyance article state determination data indicating an appropriateness determination result of a variation in the state of the conveyance article, the variation including at least one of movement of the position of the conveyance article with respect to the machine as a result of the conveyance, or movement of the position of the liquid within the conveyance article as a result of the conveyance; and
        learn an association between the conveyance operation data and the conveyance article state data by using the state variables and the determination data in order to optimize conveyance speed while maintaining an allowable variation in the state of the conveyance article.

11. A learned model for causing a computer to function so as to output a value of selection of an action for controlling a conveyance operation of a conveying machine that conveys a conveyance article relative to a state of the conveyance article during the conveyance operation,
the learned model comprising a value function for outputting, with respect to a state of an environment defined on the basis of conveyance operation data indicating a state of the conveyance operation of the conveying machine and conveyance article state data indicating the state of the conveyance article, the value of selection of an action for controlling the conveyance operation of the conveying machine that can be selected in the state of the environment, wherein
the value function has been obtained by:
    observing when the conveying machine conveys the conveyance article, as state variables representing a current state of an environment, conveyance operation data indicating a state of the conveyance operation of the conveying machine, and conveyance article state data indicating the state of the conveyance article including at least one of position of the conveyance article, or position of liquid within the conveyance article,
    acquiring, as determination data, conveyance speed determination data indicating an appropriateness determination result of a conveyance speed of the conveyance article, and conveyance article state determination data indicating an appropriateness determination result of a variation in the state of the conveyance article, the variation including at least one of movement of the position of the conveyance article with respect to the machine as a result of the conveyance, or movement of the position of the liquid within the conveyance article as a result of the conveyance, and
    learning an association between the conveyance operation data and the conveyance article state data by using the state variables and the determination data in order to optimize conveyance speed while maintaining an allowable variation in the state of the conveyance article; and
the learned model causes the computer to function so as to execute arithmetic using the value function, with the state of the environment and the action for controlling the conveyance operation of the conveying machine as input, and output, on the basis of an arithmetic result, a value of an action for controlling the conveyance operation of the conveying machine relative to the state of the environment.

12. The learned mode according to claim 11, wherein the value function is packaged in a multilayer-structure neural network.

13. A distilled model for causing a computer to function so as to output a value of selection of an action for controlling a conveyance operation of a conveying machine that conveys a conveyance article with respect to a state of the conveyance article during the conveyance operation, wherein
the distilled model comprises a value function that outputs, with respect to a state of an environment defined on the basis of conveyance operation data indicating a state of the conveyance operation of the conveying machine and conveyance article state data indicating a state of the conveyance article, the value of selection of an action for controlling the conveyance operation of the conveying machine that can be selected in the state of the environment, and wherein
the value function is a value function in which
    a state of an environment defined on the basis of conveyance operation data indicating a state of the conveyance operation of the conveying machine and conveyance article state data indicating a state of the conveyance article is input, with respect to another learned model that has learned a selection value of the predetermined control action in the predetermined environment, on the basis of an appropriate determination result of a conveyance speed of the conveyance article and an appropriate determination result of a variation in the state of the conveyance article which are obtained by executing a predetermined control action of on the conveyance operation of the conveying machine in a predetermined environment state;

the value of selection of an action for controlling the conveyance operation of the conveying machine, that is output from the learned model as a consequence and that can be selected in the state of the environment, is obtained; and the value of selection of an action for controlling the conveyance operation of the conveying machine with respect to the state of the environment has been learned by using the conveyance operation data, the conveyance article state data, and the value of selection of an action for controlling the conveyance operation of the conveying machine that has been obtained, and wherein the distilled model causes the computer to function so as to execute arithmetic using the value function, with the state of the environment and the action for controlling the conveyance operation of the conveying machine as input, and output, on the basis of an arithmetic result, a value of an action for controlling the conveyance operation of the conveying machine with respect to the state of the environment.

\* \* \* \* \*